(12) United States Patent
Radlinger

(10) Patent No.: US 8,401,530 B2
(45) Date of Patent: Mar. 19, 2013

(54) SYSTEM FOR MULTIMEDIA CONTENT-ASSISTED TRIGGER LOCATION, AND SERVICE METHODS THEREOF

(76) Inventor: Steven Charles Radlinger, Madison, WI (US)

(*) Notice: Subject to any disclaimer, the term of this patent is extended or adjusted under 35 U.S.C. 154(b) by 280 days.

(21) Appl. No.: 12/386,791

(22) Filed: Apr. 23, 2009

(65) Prior Publication Data
US 2010/0273464 A1 Oct. 28, 2010

(51) Int. Cl.
*H04M 3/42* (2006.01)
(52) U.S. Cl. ........... 455/414.2; 455/456.1; 455/404.2; 455/432.1; 455/440; 455/412.2; 455/403; 455/422.1; 455/466; 455/456.3
(58) Field of Classification Search ........... 455/456.1, 455/404.2, 414.2, 432.1, 440, 412.2, 403, 455/456.3, 422.1, 466
See application file for complete search history.

(56) References Cited

U.S. PATENT DOCUMENTS

| | | | |
|---|---|---|---|
| 2002/0102993 A1* | 8/2002 | Hendrey et al. ............... 455/456 |
| 2005/0055374 A1* | 3/2005 | Sato ........................... 707/104.1 |
| 2005/0119012 A1* | 6/2005 | Merheb et al. ............. 455/456.3 |
| 2006/0019676 A1* | 1/2006 | Miller et al. ............... 455/456.2 |
| 2008/0248815 A1* | 10/2008 | Busch ........................ 455/456.5 |
| 2009/0029718 A1* | 1/2009 | Nilsson ..................... 455/456.1 |
| 2009/0115621 A1* | 5/2009 | Nguyen et al. ............ 340/686.1 |

* cited by examiner

*Primary Examiner* — Kwasi Karikari
(74) *Attorney, Agent, or Firm* — Andrus, Sceales, Starke & Sawall LLP

(57) ABSTRACT

Disclosed is a mobile marketing and advertising based system comprised of a database, a mobile device, a trigger location (primary physical location), a secondary location in a favorable proximity to the trigger location and a means for providing multimedia content from the database to the mobile device.

9 Claims, 7 Drawing Sheets

SYSTEM FOR MULTIMEDIA CONTENT-ASSISTED TRIGGER LOCATION, AND SERVICE METHODS THEREOF

CROSS-REFERENCE TO RELATED APPLICATIONS

This application claims the benefit of U.S. provisional application Ser. No. 61/047,454 filed Apr. 24, 2008, which is hereby incorporated by reference.

BACKGROUND OF THE INVENTION

"The communication networks that provide inter-communication of the various system elements" disclosed in U.S. Pat. No. 7,512,234 filed on Mar. 23, 2001 illustrates several examples of known methods in determining mobile entity location including: 1) providing the entity with an inertial positioning system, 2) based on proximity of the mobile entity to fixed-position local beacons, 3) involving the use of GPS satellites and 4) based on the use of signals present in a cellular mobile radio communications system. All these approaches use communication networks to determine location.

Other examples of prior art utilizing some form of communication networks include U.S. Pat. No. 5,604,765 where position determination is done via a broadcast of RF navigation signals, U.S. Pat. No. 7,378,956 where location information is obtained using a ULID code of RFID tags attached to various places such as a building and U.S. Pat. No. 5,724,660 where determining the location of a mobile telephone is based on the strengths of the signals surrounding the mobile telephone within a mobile telephone system serving area.

The first handheld mobile phone in the US market was the Motorola_Dyna 8000X, which received approval in 1983. Mobile phones began to proliferate through the 1980s with the introduction of "cellular" phones based on cellular networks with multiple base stations located relatively close to each other, and protocols for the automated "handover" between two cells when a phone moved from one cell to the other.

In the 1990s, 'second generation' (2G) mobile phone systems such as GSM, IS-136 ("TDMA"), iDEN and IS-95 ("CDMA") began to be introduced. In 1991 the first GSM network opened in Finland. 2G phone systems were characterized by digital circuit switched transmission and the introduction of advanced and fast phone to network signaling.

In 1993, Apple's MessagePad, the first PDA (Personal Digital Assistant) a handheld computer for managing contacts, appointments and tasks, was introduced.

The second generation mobile phone system introduced a new variant to communication, as SMS text messaging became possible, initially on GSM networks and eventually on all digital networks. 2G also introduced the ability to consume media content on mobile phones, including downloadable ring tones as paid content.

In 1999, BlackBerry's PDA offered wireless synchronized e-mail between the PDA and desktop computer via USB or wireless.

As time went by the functions performed by PDAs were integrated into the many advanced cellular phones.

This has led to a significant decline in demand for standalone PDA's and voice-only mobile phones which are increasingly being replaced by smartphones, converged devices which integrate mobile computing with wireless communication. New features, including 3D games, mobile email, multimedia applications, and even Wi-Fi internet access have become commonplace on modern day smartphones, making them both practical and entertaining.

Devices that were once used exclusively for voice services are now used to send and receive email, to take pictures, to surf the Internet and to play music.

In 2007, the Apple iPhone was introduced offering a touchscreen display that actually made surfing the Web on mobile phones an enjoyable experience. Additionally, the phone gave users the ability to listen to music and watch movies, as well as the option to surf the web over local Wi-Fi connections and get map/location (Location-based services) information. Several smartphones have since followed in the iPhone's path, including the BlackBerry Storm, the Samsung Instinct, the Palm Pre and the HTC G1.

Not long after the introduction of 2G networks, projects began to develop third generation (3G) systems. 3G systems increased fast phone to network signaling to 2Mbit/s maximum data rate indoors, and 384 kbit/s outdoors, for example. By the end of 2007 there were 295 Million subscribers on 3G networks worldwide. 3G systems allow for live streaming of media content including radio and television.

Today, the burgeoning market in distributing media is mobile (WAP Internet). Consumers, though still enjoy the benefits on viewing media online (WEB Internet) via a desktop or laptop computer.

Media that is streamed or downloaded by mobile phones typically falls into 3 categories including video (i.e. television or movies), audio (i.e. music or voice) and images (i.e. wallpaper, backgrounds), typically, independent of location or if by location, location is first determined by a communication network and some form of radiolocation.

Location-based services (LBS) are applications that leverage a user's physical location to provide an enhanced service or experience, such as providing directions to the nearest restaurant.

Today, LBS technology exists but most services are stand-alone applications without the benefit of content to initially attract and sustain a subscriber base.

The level of opportunity and subsequent success of LBS in the marketplace (or lack thereof so far) has had a lot to do with the level of accuracy the carrier can provide in pinpointing the location of the user and mobile device.

Determining precise location, historically, has required some form of radiolocation—that is, the plotting of the position of a moving terminal, i.e. cell phone, either by receiving multiple signals at a single site or the reverse, a single signal at multiple sites.

GPS is generally superior in the precision with which it can locate a terminal, but it is inferior to network-based systems in terms of penetrating a building. Other technologies include Cell ID positioning/triangulation (accurate within 50-300 meters) E-OTD (enhanced observed time difference), and assisted GPS (A-GPS). A-GPS combines straight GPS signals with network-based location data to compensate for the line-of-sight requirement of GPS that makes it useless inside buildings, buses, trains, or anything else that blocks the terminal's view of the GPS system. A-GPS brings the accuracy level within around 30 meters but possibly as close as 10 meters with a strong signal.

According to a report from ABI Research, GPS-enabled LBS subscribers, globally, will rise from 12 million in 2006 to 315 million in 2011. That represents an increase from less than 0.5% of total wireless subscribers today to more than 9% worldwide in the next five years. For example, the technology selected by Verizon Wireless to enable LBS includes A-GPS receivers embedded in the mobile devices, together with new network elements that assist with location determination, mediate access to common geo-services and data, and enforce subscriber permissions related to privacy. The A-GPS system aids the device in locating itself. The device's location may be determined via a device-initiated application, wherein the subscriber invokes a location aware application from their mobile phone. If the device does not have visibility to the GPS satellites, it will revert to network triangulation to acquire its location. A network provides the satellite information to the device, based on a rough estimate of where the device is located, and the device acquires the GPS signals from the satellites and calculates its location. After the initial fix, the device operates like an autonomous GPS receiver, until the satellite information must be refreshed, at which time the device goes back to the network to update the satellite information.

In 2001, Airbiquity and InfoSpace announced an agreement to jointly market location-based audio wireless services. Their model was to allow wireless users to easily access audio location-based information, such as restaurants, gas stations, movie theaters, and more. Coupled with InfoSpace's commerce offerings, the solution provides end-users with complete access to targeted information and commerce capability over mobile devices relevant to their location at a specific time. The only problem: Airbiquity's technology was about five years too early. According to Kamyar Moinzadeh, CEO, "It was too early and the model required a GPS in the handset, which was really cost-prohibitive." In an attempt to get around the issue, Airbiquity built a GPS accessory and battery for mobile phones. But that offering—introduced in 2000—did not catch on and was quickly abandoned.

All prior art patents pertaining to mobile devices and LBS, tap into cell phone tower triangulation, WIFI networks or in-phone GPS chips to determine location, which are only accurate to within 50-300 meters. The prior art has proved to be costly to implement as they required specialized equipment, and are prone to problems with accuracy and reliability.

Advertisers and marketers of a wide array of products and services, particularly local services, are excited about LBS because it would enable them to direct ads in real-time based on the specific geographic location of a mobile phone user—in other words, instant point-of-purchase advertising.

KDDI, considered one of the leaders in LBS in Japan, offers Mobile McDonald's, which not only allows users to locate the nearest McDonald's, but also allows McDonald's to send coupons to nearby users. However, due to privacy concerns, this kind of 'pushed' content is generally only delivered to mobile users that have given their permission to receive the advertising on their mobile device.

SUMMARY OF THE INVENTION

The invention herein described, on the other hand, is primarily focused on leveraging rich mobile content to drive LBS.

One feature of the invention is to provide multimedia content tailored to a primary physical location for delivery to mobile devices that may or may not be situated in the vicinity of said primary physical location.

Another feature of the invention is to contain within said multimedia content, data concerning said primary physical location, and other data not necessarily related to said primary physical location.

Yet another feature of the invention is to provide data to the mobile device user concerning secondary locations in relatively close proximity to said primary physical location.

Yet another feature of the invention is determine in advance of delivery to mobile device user the identity of said secondary locations in relatively close proximity to said primary physical location.

Yet another feature of the invention is provide said multimedia content to mobile device user by means of wireless delivery.

Yet another feature of the invention is to provide said multimedia content to mobile device user by means of a memory card or by sideloading, i.e. by connecting to and downloading from the Internet via a desktop or laptop computer.

Other features and benefits of at least some embodiments of the invention will become apparent in the detailed description of the invention.

DETAILED DESCRIPTION OF THE PREFERRED EMBODIMENT

General Overview

Figure 1A:
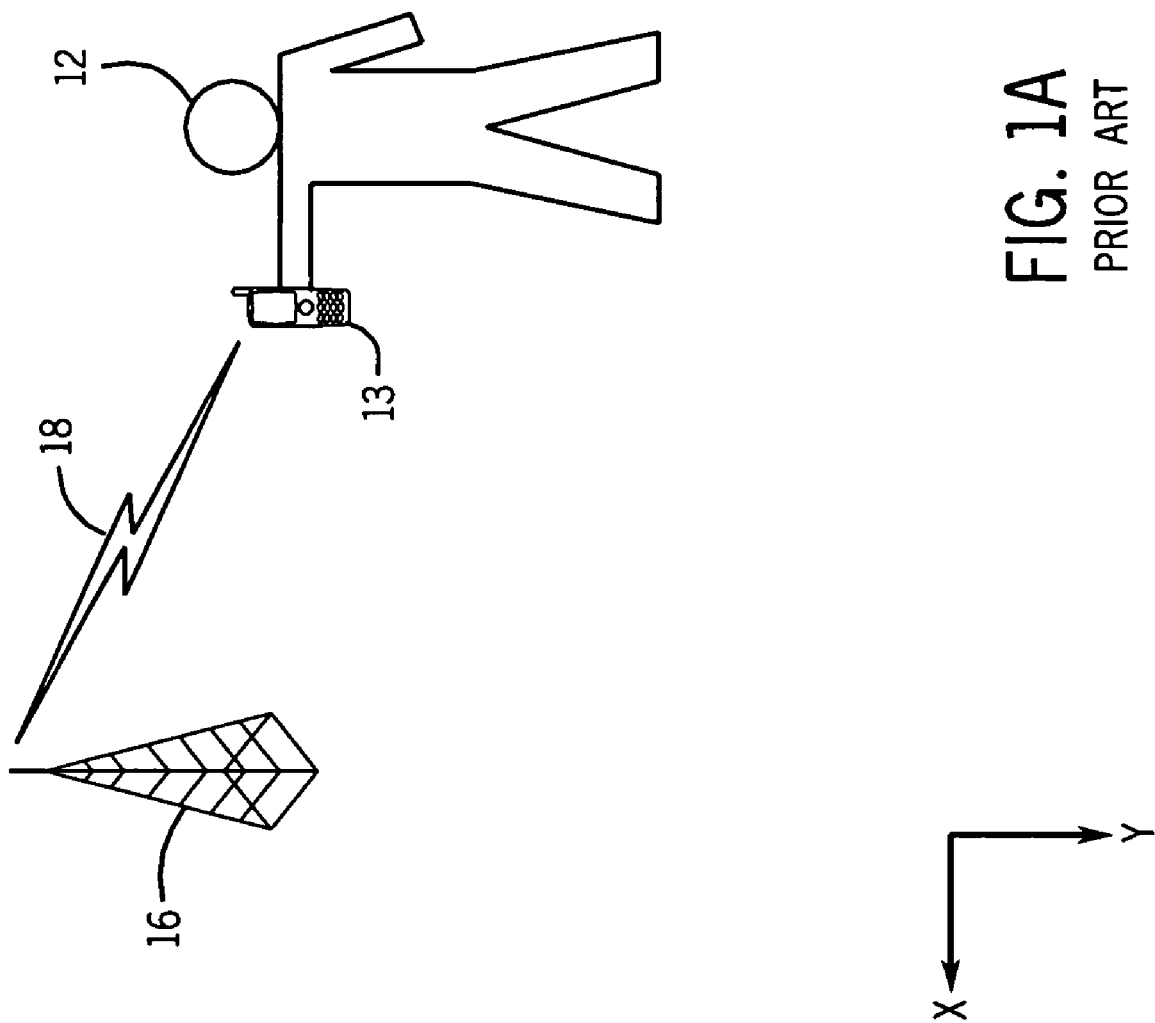
FIG. 1A is a schematic diagram of prior art.

A customer visits an Internet site via a wireless communication network connection with a mobile device and initiates their interaction with the multimedia content, thereby 'pulling' the content. Upon playing the multimedia content relating to a primary physical location, which denotes location, the customer initiates the engagement of accessing information of secondary locations—that is information on businesses and other points of interest.

A traveler, for example, may wish to view, and/or listen to, multimedia content pertaining to the Lincoln Memorial (a primary physical location). The multimedia content may be transmitted via a wireless communication network to the traveler's mobile device. The traveler may be standing in front of the Lincoln Memorial or not. After playing the multimedia content pertaining to the primary physical location, the traveler may access information on secondary locations. The correlation of data pertaining to the primary location and the secondary locations, and their proximity to each other, has been determined and incorporated into the multimedia content prior to the traveler's accessing said multimedia content.

The significance of the secondary locations is determined by the location of the secondary locations relative to the primary physical location.

To access information about secondary locations—bars, restaurants, attractions, other points of interest that are near to, or around the corner from, the primary physical location, the traveler chooses/clicks on the appropriate links.

This location based positioning system uses a content-based model to deliver location based advertising and marketing to the traveler based on content viewed rather than GPS or other wireless communication networks.

In another scenario, rather than receive the multimedia content via a wireless connection, the multimedia content is sideloaded or accessed via a memory card.

The location based services (LBS) model of this invention enables advertisers to direct ads in real-time to travelers without having to depend on GPS or other location technologies. More so, this invention uses the location of a primary physical location to deliver information on secondary locations that are nearby.

The multimedia content is the focal point of travelers when they travel to a primary physical location and is the basis for serving accurate LBS.

The LBS positioning system of this invention supersedes GPS or cell tower-triangulation based systems which were the only potential means for delivering location-based services. As evidenced by the slow growth in LBS services, these traditional systems proved to be costly to implement as they required specialized equipment, and prone to problems with accuracy and reliability.

GPS does not work indoors, struggles in downtown areas, and is expensive. GPS performs poorly in urban areas where buildings block the view of satellites, and it doesn't provide any coverage inside of buildings. Cell tower triangulation is inaccurate—mobile networks can calculate a position, but the accuracy is rather low (50-300 meters), and, like GPS, requires specialized hardware. Some applications require a high degree of reliability and good indoor performance, which creates technical challenges for application providers.

This invention achieves exact positioning accuracy using contextual information (content being viewed).

The features described above will become more apparent in the following detailed description of the invention.

DETAILED DESCRIPTION

Figure 1B:
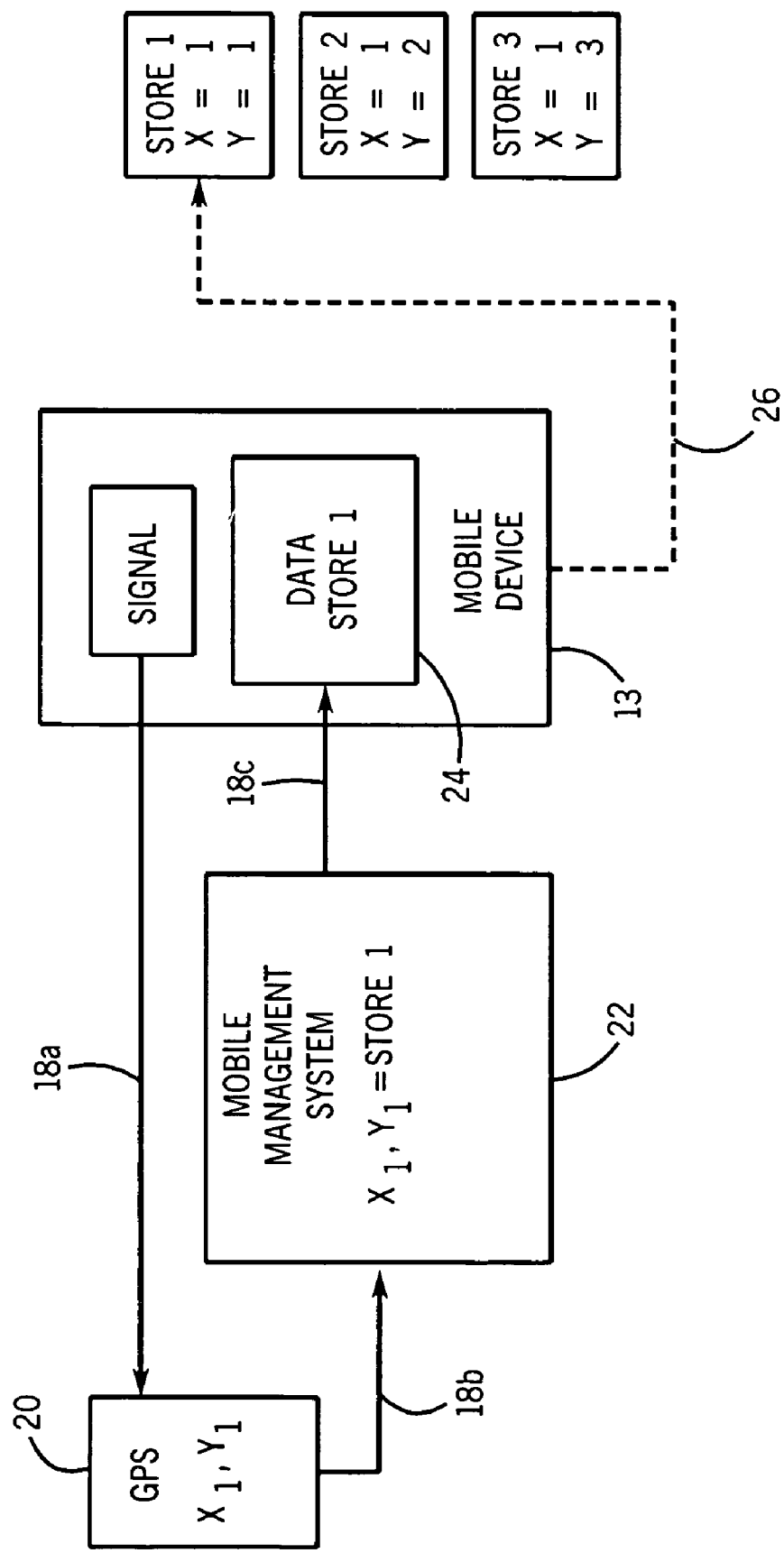
FIG. 1B is a schematic diagram of prior art.

Prior art FIGS. 1A and 1B generally illustrate how a mobile entity transmits signals between and among various communication networks to determine location.

In FIGS. 1A and 1B, mobile device user 12 holds mobile device 13 which is receiving and sending data to and from cellular source 16 via a general signal 18 (or wireless communication network). Three locations are shown, store 1, store 2, and store 3, each defined by unique coordinates. The location of store 1 is defined by coordinates x=1, y=1, the location of store 2 is defined by coordinates x=1, y=2, and the location of store 3 is defined by x=1, y=3.

If store 1 has data that may be of interest to mobile device user 12, a Global Positioning System (GPS) 20, associated with cellular source 16, may receive a signal 18a from mobile device 13, that mobile device 13 is in close proximity to store 1, at coordinates x=1, y=1. GPS 20 then sends a signal 18b to mobile management system (or mobile positioning server, or application server, or content server, or wireless portal) 22.

Mobile management system 22 then sends data 24 via wireless signal 18c to mobile device 13 regarding store 1. This data may, for example, be an announcement that store 1 is having a sale or that user 12 is entitled to reduced prices on certain items, or any other data that will attract user 12 to store 1. Mobile device user 12 presumably visits store 1, as indicated by dashed line 26 in FIG. 1B.

Figure 2A:
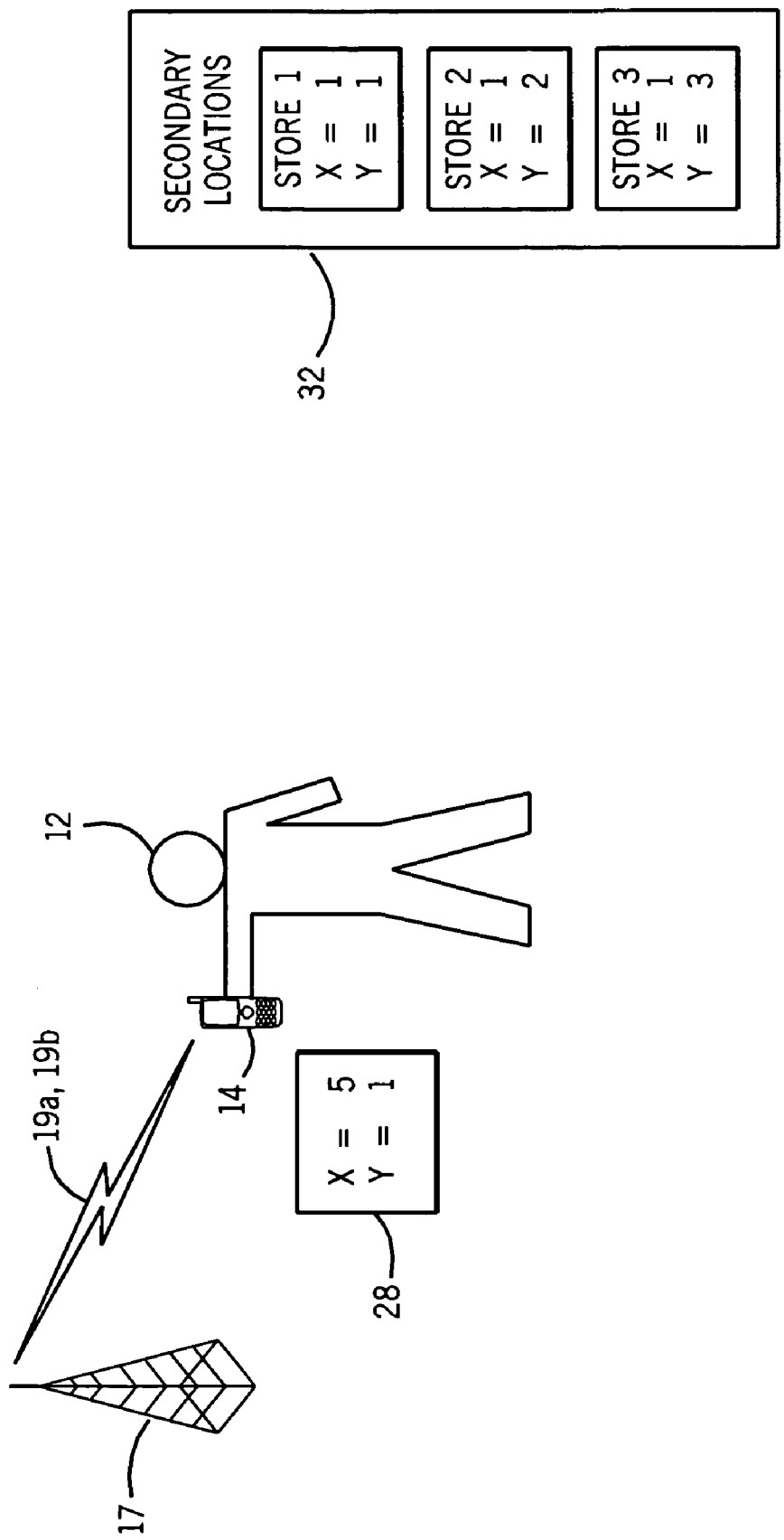
FIG. 2A is a schematic diagram of a first embodiment of the invention.

Referring to the first embodiment of the present invention, specifically as shown in FIG. 2A, mobile device user 12 holds mobile device 14. Mobile device 14 sends and receives wireless signals 19a and 19b respectively from and to cellular source 17.

Mobile user 12 is in close proximity to primary physical location 28, at coordinates x=5, y=1, but not in very close proximity to secondary locations 32, stores 1, 2, and 3. That is, the significance of mobile device user's position is not that he is in close proximity to secondary locations 32, stores 1, 2, or 3, but that he is in close proximity to primary physical location 28. In the prior art example, the only location of significance is store 1. In the prior art, mobile device user 12's proximity to store 1 itself triggers the signal to the GPS which in turn signals the database 22 to send data to mobile device 13.

Mobile device user 12 may or may not be within range of eyesight of secondary locations 32, stores 1, 2, and 3. Primary physical location 28 may, for example, be of interest to mobile device user 12 with no relationship to secondary locations 32, stores 1, 2, and 3.

Figure 2B:
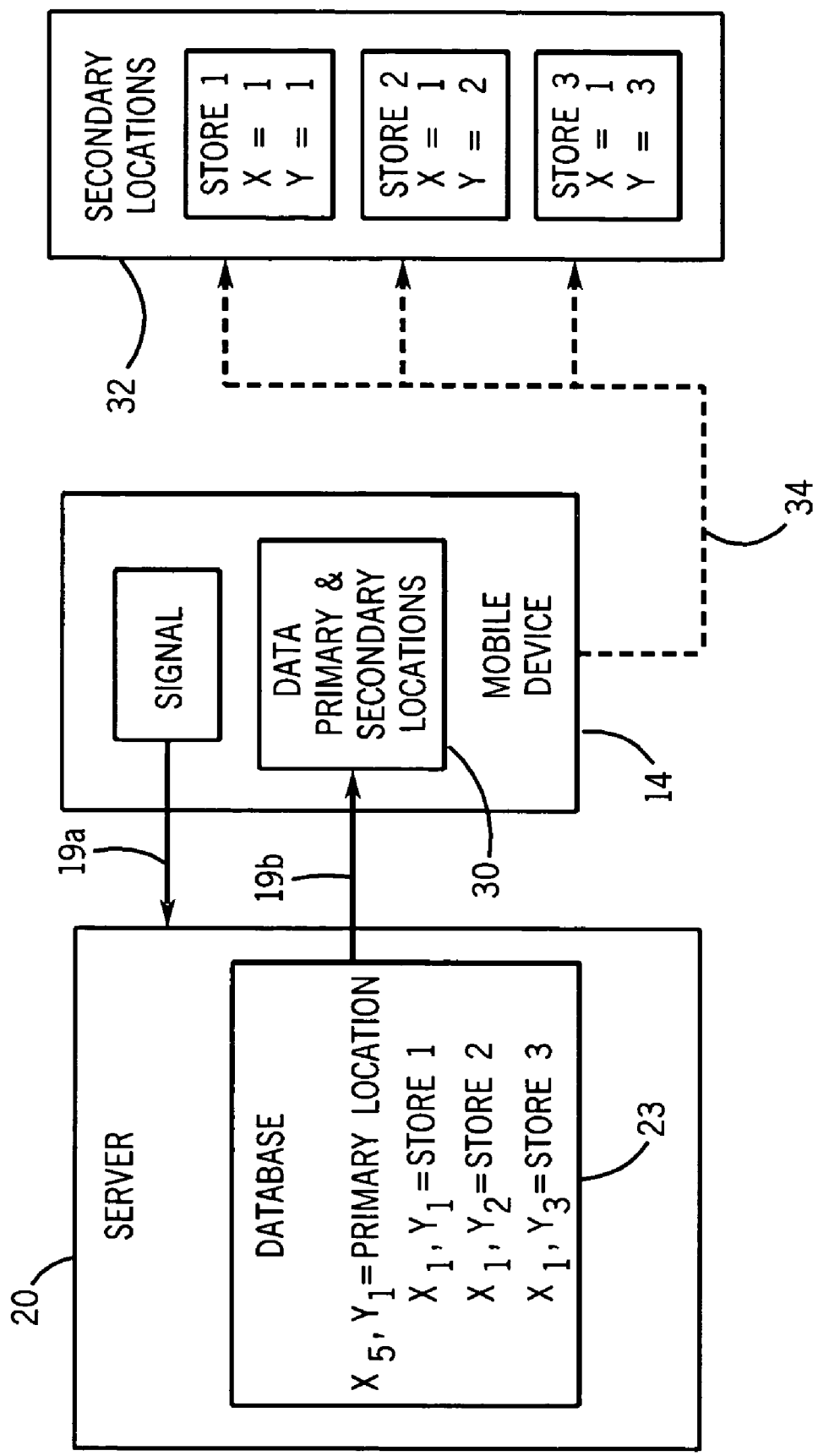
FIG. 2B is a block diagram of the first embodiment of the invention.

Referring also to FIG. 2B, wireless signal 19a from mobile device 14 requests data from server 20 pertinent to primary physical location 28, and secondary locations 32, stores 1,2, and 3. Server 20 connects with database 23 in which database 23 identifies the multimedia content associated with primary physical location 28, and secondary locations 32, stores 1, 2, and 3, in relative proximity to primary physical location 28.

Primary and secondary location information 30 is sent via wireless signal 19b to mobile device 14.

Primary and secondary information 30 may, for example, include a menu if, say, secondary location store 1, is a restaurant, a sale announcement for secondary location store 2, and other data for secondary location store 3.

Primary and secondary information 30 may also contain coordinate data (X5,Y1) for primary physical location 28 with coordinates of secondary locations 32 (for example, store 1 is located at X1,Y1).

The distinction over the prior art is that in the invention, proximity to a location is not a prerequisite for primary and secondary information to be transferred to mobile device 14. Also, in the invention, database 23 correlates primary physical location coordinate data with secondary location store coordinates, and then sends data 30, pertinent to any or all secondary locations 32, stores 1, 2, or 3. Mobile device user 12 may visit any number of stores, as indicated by dashed line 34 in FIG. 2B.

Figure 2C:
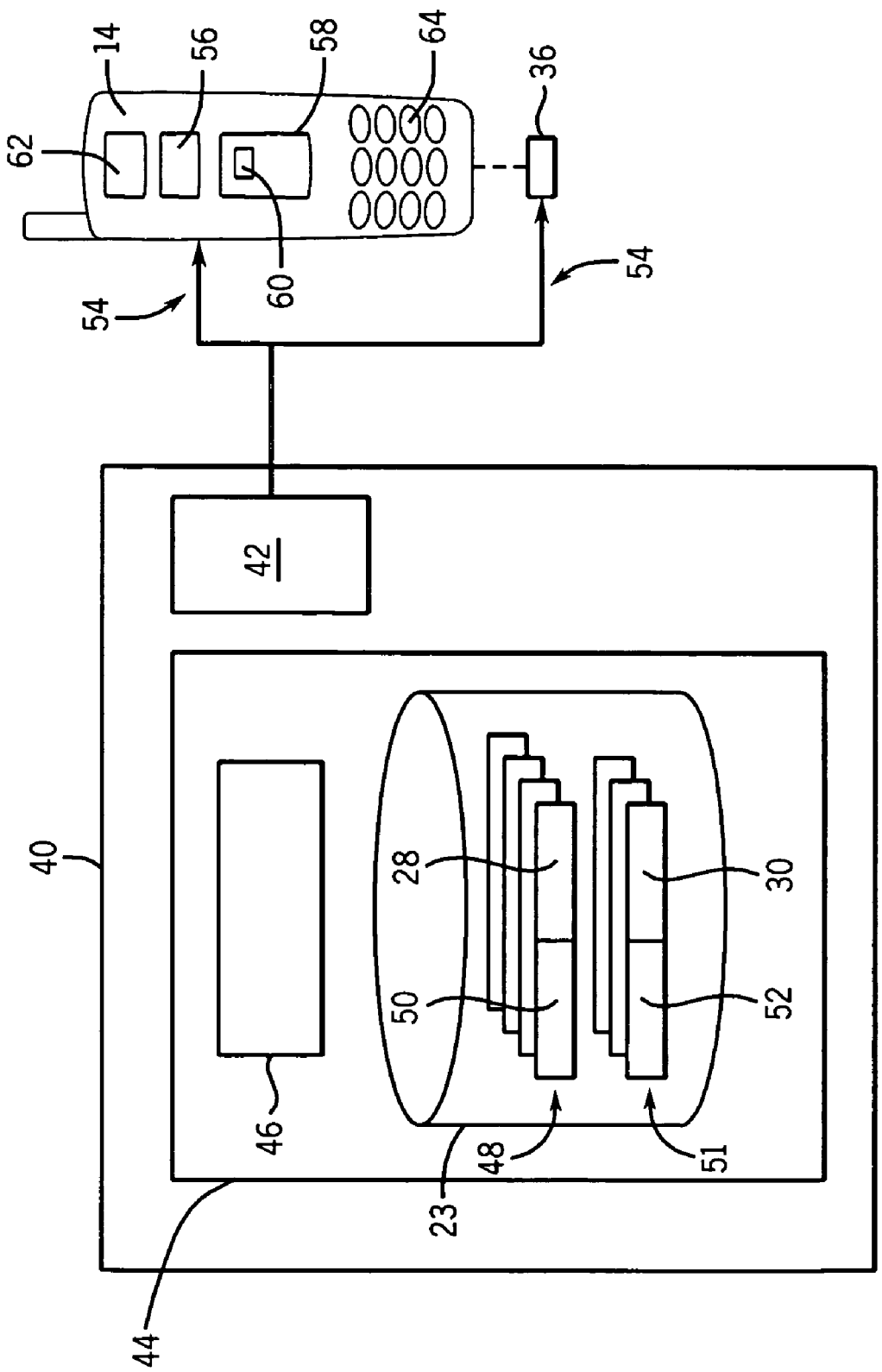
FIG. 2C is a logical diagram of the first embodiment of the invention.

Referring now to FIG. 2C, an electronic computer 40 may include a processor 42 and electronic memory 44 the latter holding a program 46 implementing the present invention and the database 23.

The database 23 may include a first set of records 48 each record including cultural or historical information 50, as described above, linked to a primary location 28 or locational context. Also within the database 23 may be a second set of records 51 having advertising messages 52 linked to secondary locations 30.

Generally, in operation, the processor 42 executes the stored program 46 to serve the cultural or historical information 50 to a remote user having a mobile device 14 based on a request by the user for particular information 50. The serving process includes identifying the primary location 28 associated with the information 50 and then sorting through second records 51 to identify one or more advertising messages 52 having a secondary location 30 related to the primary location 28 as discussed above. The information 50 and advertising messages 52 may then be packaged and served wirelessly or through the agency of a memory card 36 which may be inserted into the mobile device 14 as indicated by arrows 54.

The mobile device 14 may include a processor 56 and memory 58 the latter holding a player 60 being a program that may read the information 50 for display on a display 62 of the mobile device 14, for example, as initiated by input through a keyboard 64.

Figure 3A:
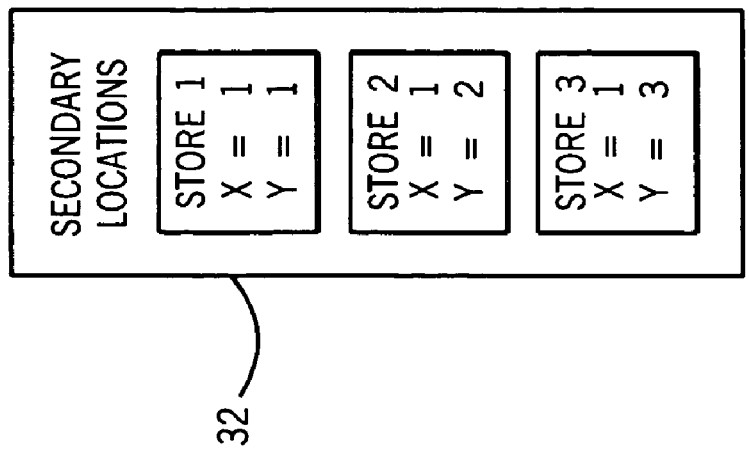
FIG. 3A is a schematic diagram of a second embodiment of the invention.
Figure 3A:
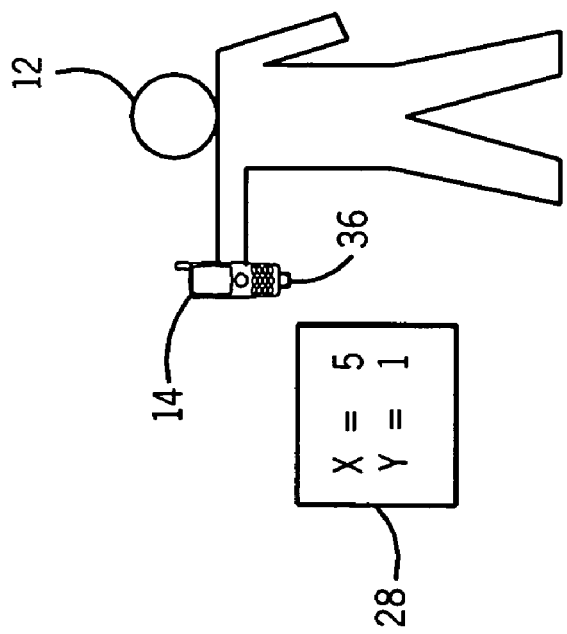
Figure 3A:
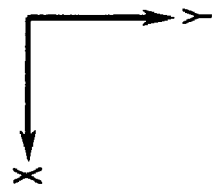
Figure 3B:
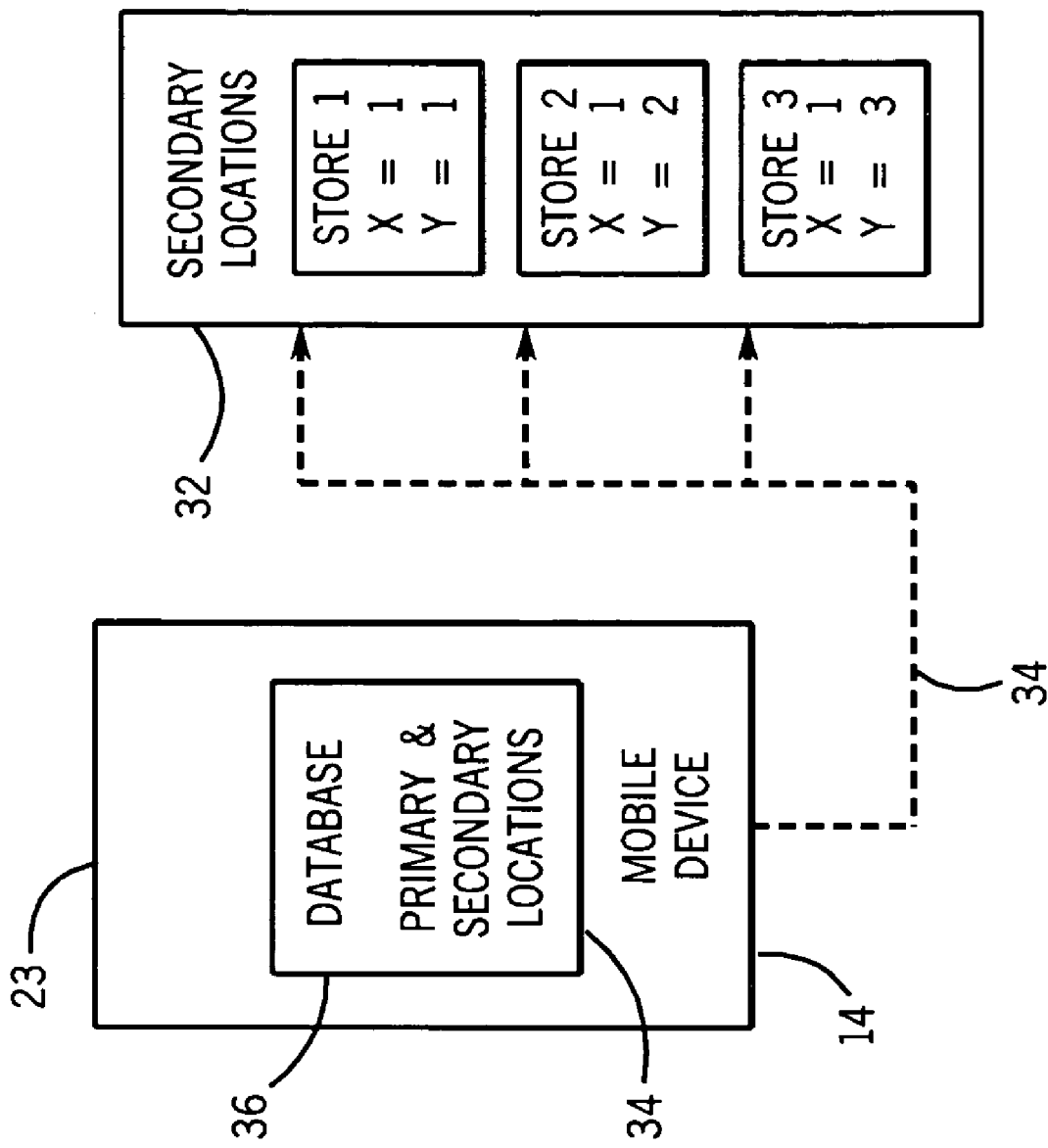
FIG. 3B is a block diagram of the second embodiment of the invention.

Referring to FIGS. 3A and 3B, the second embodiment of the invention, primary and secondary information is stored on memory card 36. Mobile device user 12 may be inclined to visit any number of stores, as indicated by dashed line 34 in FIG. 3B.

What is claimed is:

1. A marketing system comprising:
   receiving a user query for multimedia information;
   determining a primary location of the user based on a context and a meaning of the multimedia information queried;
   obtaining secondary locations in close proximity to the primary location; and
   providing advertising for the secondary locations to the user;
   wherein an electronic computer implementing an electronic database links the multimedia information to a primary location, and further linking the secondary locations to the primary location, wherein the primary location is associated with the multimedia information queried by the user;
   the database further linking advertising messages to the secondary locations, where the electronic computer executes a stored program to assemble the secondary locations related to the primary location, together with at least one advertising message linked to at least one of the secondary locations;
   at least one mobile device including a memory and a processing device, the memory adapted to receive the multimedia information and advertising message together with a display program, the display program executable by the processing device to:
   (i) receive a command from the user of the mobile device to display the multimedia information;
   (ii) based on the primary location associated with the multimedia information, identify at least one advertising message having one of the secondary locations proximate to the primary location; and
   (iii) contemporaneously with the command, displaying the at least one advertising message at the mobile device, whereby geographically relevant advertising messages may be delivered to the user of the mobile device at a relevant time independently of the location of the mobile device.

2. The marketing system of claim 1 wherein the advertising messages are for businesses having geographic locations near the primary location.

3. The marketing system of claim 1 wherein the electronic computer further implements a real-time server serving at least one of the information and advertising message to the mobile device after the command from the user is received by the mobile device.

4. The marketing system of claim 3 wherein the serving employs a wireless serving network.

5. The marketing system of claim 3 wherein the real-time server selects advertising messages for serving to the mobile device after the command from the user is received by the mobile device.

6. The marketing system of claim 1 wherein the electronic computer further includes a program for writing at least one of the information and advertising message to a memory card receivable by the mobile device.

7. The marketing system of claim 1 wherein the information is a multimedia presentation of a location.

8. The marketing system of claim 1 wherein the mobile device is selected from the group consisting of: a telephone, a handheld entertainment system, a portable digital assistant, and a portable computer.

9. The marketing system of claim 1 wherein the multimedia information and the advertising message are combined in a single presentation when displayed by the mobile device.

* * * * *